June 11, 1935.    R. N. TRANE    2,004,255
AIR CONDITIONING UNIT
Filed May 15, 1933    8 Sheets-Sheet 1

Inventor:
Reuben N Trane
BY Arthur T Holmes
ATTORNEY

June 11, 1935.  R. N. TRANE  2,004,255
AIR CONDITIONING UNIT
Filed May 15, 1933  8 Sheets-Sheet 2

Inventor:
Reuben N. Trane
BY Arthur T. Holmes
ATTORNEY

Fig. 8

June 11, 1935.  R. N. TRANE  2,004,255
AIR CONDITIONING UNIT
Filed May 15, 1933  8 Sheets-Sheet 5

*Fig. 9* — Basement

*Fig. 10* — First Floor

Inventor:
Reuben N. Trane
BY Arthur F. Holmes
ATTORNEY

June 11, 1935.   R. N. TRANE   2,004,255
AIR CONDITIONING UNIT
Filed May 15, 1933   8 Sheets-Sheet 7

Inventor:
Reuben N. Trane
BY Arthur T. Holmes
ATTORNEY

Patented June 11, 1935

2,004,255

UNITED STATES PATENT OFFICE 2,004,255

AIR CONDITIONING UNIT

Reuben N. Trane, La Crosse, Wis.

Application May 15, 1933, Serial No. 671,034

8 Claims. (Cl. 257—9)

My invention relates to an air conditioning unit whereby the air in a building may be heated or cooled, cleaned and humidified.

One of the objects of my invention is an air conditioning unit within one casing having provision for heating, humidifying, cooling and cleaning.

Another object of my invention is a complete conditioning system with provision for the circulation and return of the conditioned air to and from the rooms.

Another object of my invention is the further combination with said exchanger of an efficient and novel humidifier.

Another object of my invention is the prevention of warping of the humidifier.

Another object of my invention is the elimination of warping and cracking of the exchanger by a novel combustion chamber wherein the flame is close to but does not strike the exchanger.

Another object of my invention is to provide within said casing a second compartment containing controls and means to keep the second compartment cool.

Another object of my invention is to provide means within said casing for directing the flow of air through the casing against fins and through flues formed by the fins on the exterior of the heat exchanger.

Another object of my invention is the correlation of the flow of air on the exterior of the exchanger with the flow on the interior so as to most efficiently transfer the maximum amount of heat from the exchanger casting to the air on the outside of the exchanger.

Another object of my invention is the adaptation of the unit for either heating or cooling and the use of the same system of supply and return for both by varying the outlet.

Another object of my invention is the use of waters of two different temperatures for cooling the air, or the use of liquid of one temperature and gas of another temperature.

Another object of my invention is to provide within the casing means for the elimination of condensation when the air is cooled.

The various features of novelty which characterize my invention are pointed out in claims annexed to and forming a part of this specification.

In the accompanying drawings which illustrate my invention.

Referring to Figures 1 to 8 inclusive, the blower fan 1 is mounted in the housing 2 beneath the air filter 3, whereby air is drawn through the filter 3 and the housing 2 into contact with the heat exchanger 4, comprising a metal casting, the sides of which have integral fins 5 extending vertically and forming flues 6 for the passage of air. The casting is preferably made in two halves conventionally joined together and is provided in the front with flue doors or clean-out doors 7, which are separate castings conventionally secured to the casting 4 by the lugs 7A so as to make an air and gas tight joint and prevent the escape of gas from the heat exchanger through the flue door. The doors 7 have a double use, first providing a ready access to the interior of the exchanger 4 and, second, forming a part of a novel humidifier. Channel-shaped troughs 8 are integral with the clean-out doors, each trough being inclined toward the trough below it. Each trough is provided at its lower end with an aperture 13 in the bottom of the trough, whereby the water flows from one trough to the trough directly below. At either end of the trough is an end wall 15 to prevent overflow.

Figures 1, 2, 3:
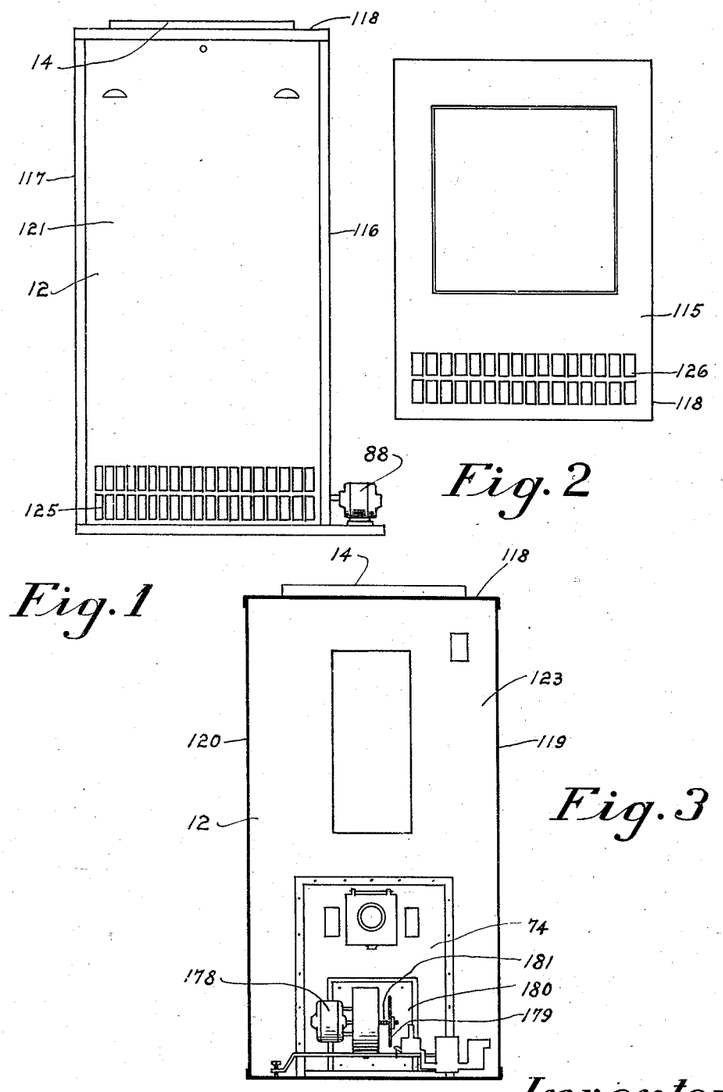
Figure 1 is a front view of the casing.
Figure 2 is a top view of the casing.
Figure 3 is a front view of the casing with front panel removed.
Figure 4:
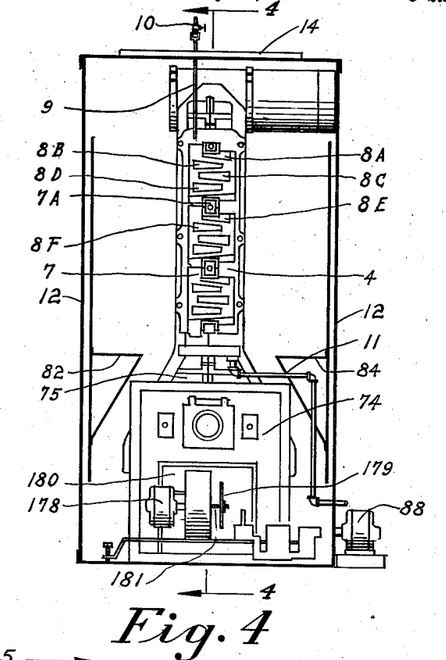
Figure 4 is a front view of the casing with front casing in Figure 3 removed and showing front view of humidifier.
Figure 5:
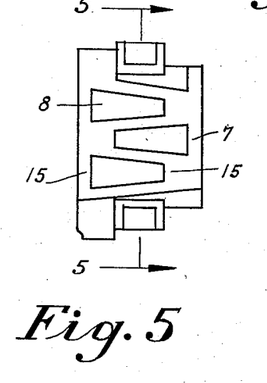
Figure 5 is a front elevation of the heat exchanger showing the clean-out doors and showing the humidifier trough.
Figure 6:
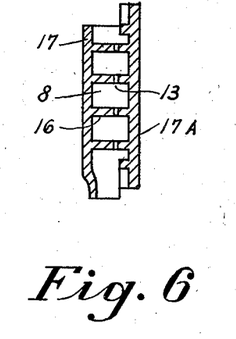
Figure 6 is a sectional view of the humidifier troughs taken on the line 5—5 of Figure 5.

As shown in Figures 4 and 5, each trough consists of the bed 16, side wall 17, an end wall 15, while the inner wall is formed by the wall 17A of the flue door 7. The water is supplied to the troughs by means of a supply line 9 controlled by a needle valve 10. If preferred, this may be automatically controlled by means of a humidistat operating a solenoid valve. As water flows into the trough 8A, it is subjected to the heat of the clean-out door and a portion of the water is humidified. Whatever water is not evaporated in the trough 8A falls into the trough 8B, where a similar process of evaporation takes place, and similarly the water remaining unevaporated after passing over trough 8B falls into trough 8C, and then on trough 8D, 8E, 8F successively. If there is any water remaining unevaporated after passing over the last trough, it falls into a waste overflow pipe 11. The flue doors 7 form a portion of the front wall of the heat exchanger and are subjected to the heat within the exchanger, so that water is readily and easily evaporated in the trough 8. Also the air is forced by the blower fan 1 into contact with the heat exchanger 4 and this air being heated readily absorbs the evaporated moisture.

By this method of humidification a large amount of water can be evaporated. It will be understood that the water to be evaporated does not come into contact with the heat exchanger 4, which is a large casting and unsuitable to be used as an evaporator due to the unequal strains produced thereby and the consequent tendency of warping and cracking. On the other hand, the flue doors 7 are of a very small casting with only a small probability of cracking. Also the replacing of a flue door 7 with a similar casting would be easy and inexpensive. The air passing over the heat exchanger 4 is confined within the casing 12, comprising front, rear, top and side wall preferably of metal, enclosing the heat exchanger 4.

Referring to Figures 1 to 7 inclusive, 115 represents the top wall of the casing, 116 and 117 the side walls thereof, 122 the back wall, all of which form an enclosure 124 containing the exchanger, oil burner, humidifier, fan, cooling coils and eliminator plates, while a second enclosure 114 is formed by the extended top wall 118, the extended side walls 119 and 120, and the front wall 121 of the second enclosure. This enclosure contains the oil burner controls and furnastat regulator 89A.

The second enclosure 114 being adjacent to enclosure 124 containing the exchanger is liable to become overheated, and to avoid this a convection current of air is produced in the second enclosure 114 by an apertured grille or opening 125 in the bottom portion of the front wall 121, and a similar grille 126 in the extended top wall 118. This convection current of air serves to keep the second enclosure cool and prevents the overheating of the motor and safety devices for the burner.

The heat exchanger 4 comprises two castings, 72 and 73, (see Figures 4, 7 and 8) fastened together at 74 by the conventional lug and flange method. The bottom portion of the exchanger is flared out to form the combustion changer 75 in which is placed a fuel burner, preferably either of the gas or oil type. The heat exchanger absorbs the direct radiant rays of the flame and the interior baffles 76, 77, 78 and 79 perform a double duty, first, of transmitting heat to the exterior of the casting by conduction and, second, directing the flow of the hot gases against the sides of the exchanger to effect a maximum amount of heat transfer. The shape of the casting is important as regards the danger of warping and cracking, so that the exchanger casting has been designed with the interior fins or baffles 76 integral with the casting, running substantially horizontal, and the exterior fins 5 running substantially vertical. This construction reinforces the heat exchanger and reduces the amount of metal ordinarily required to be used in the casting, thus increasing its efficiency. Attached to the side walls of the casing 12 are baffles 82 and 84 directing the flow of air against the fins 5 and flues 6.

Figure 9:
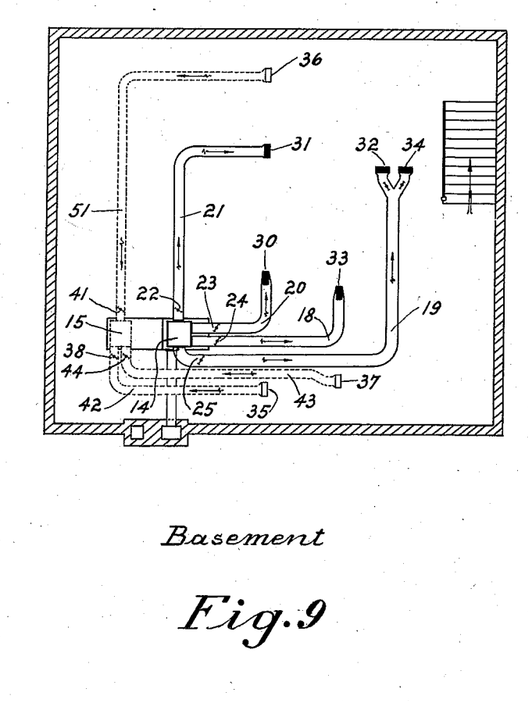
Figure 9 is a top plan view showing the distribution of air to rooms.
Figure 10:
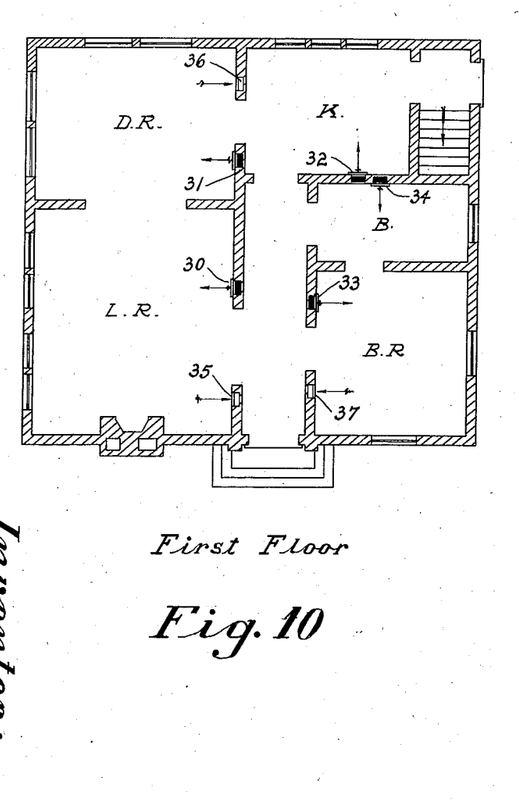
Figure 10 is a plan view showing the supply and return ducts and registers to rooms.

As shown in Figure 9, the conditioned air passes from the casing 12 to the space to be heated or cooled through an air outlet 14 communicating with supply ducts 18, 19, 20 and 21 respectively, controlled by butterfly dampers 22, 23, 24 and 25. The air passes through flues or stacks, emitting into the spaces to be conditioned through air outlets or registers 30, 31, 32, 33 and 34, which are located at the baseboard of the room and close to the floor.

Figure 11:
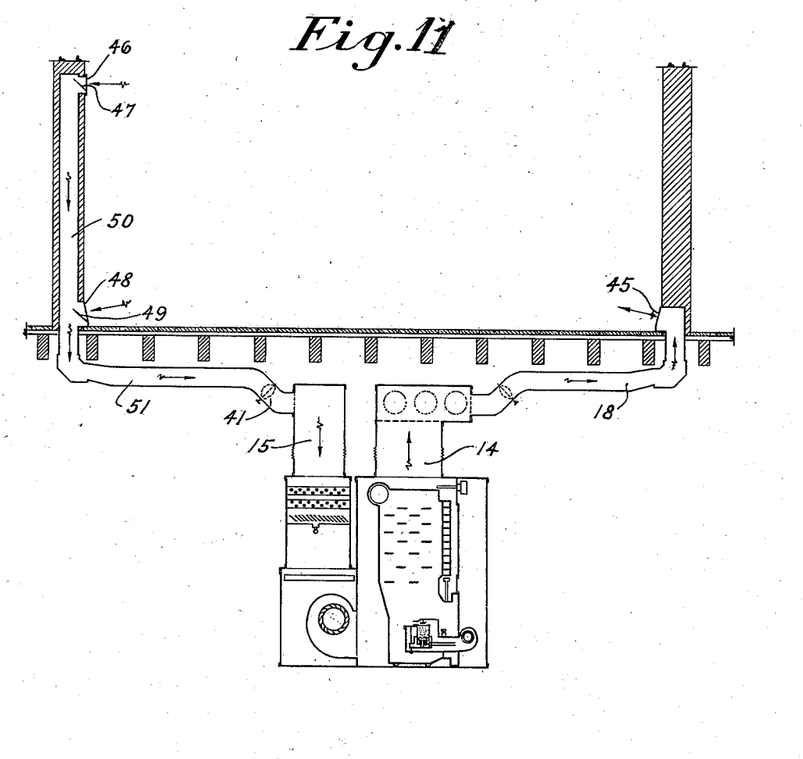
Figure 11 is a sectional view of installation in house showing connections to units from rooms.
Figure 12:
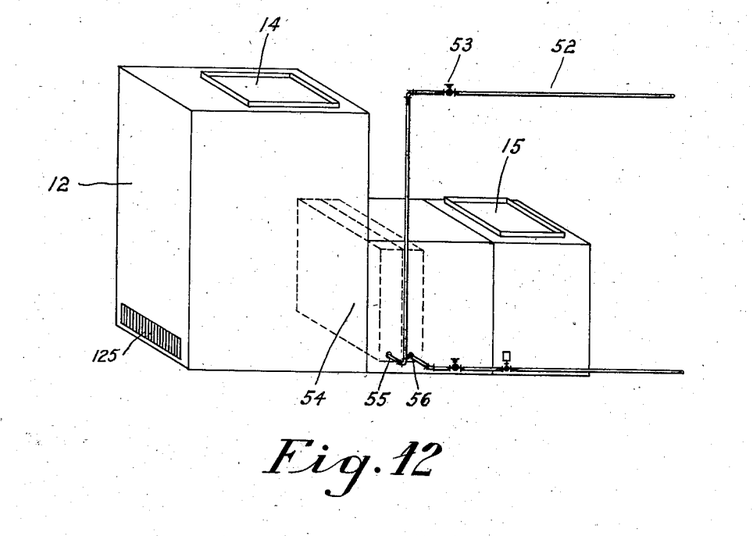
Figure 12 is a perspective view of the unit showing the cooling coils in phantom, together with the cold water connections.
Figure 13:
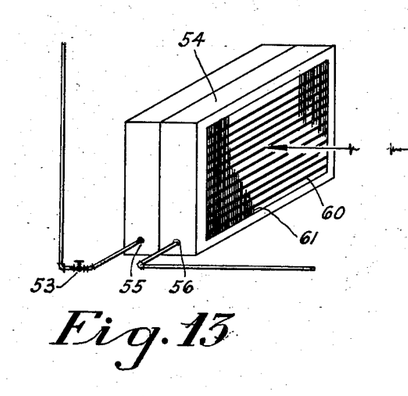
Figure 13 is a perspective view of the coil shown in Figure 14, together with water connections.

The conditioned air returns from the rooms through air inlets 35, 36 and 37, as shown in Figures 11, 12 and 13, in which 18 represents the supply duct, 45 air outlet, and 46 and 48 return air inlets, respectively controlled by dampers 47 and 49 and both communicating with the return flue 51. The return air outlet 48 is designed for the return of air when the system is being used to heat the rooms, and the return air outlet 46 is designed for the return of air when the system is used to cool the rooms. When heated air emits from the register 45, it rises and the cold air descends so that it is best to have the cold air return through air return 48. However, when cooled air emits from the register 45, it tends to stratify with the coldest air near the floor and it is unsatisfactory to take the return air from near the floor, but it is preferable to take the return air from a point approximately six feet from the floor, so that in the summer warm air is returned instead of cold air. Thus, in the summertime the damper 49 would be closed and the damper 47 open, returning the warm air through the duct 50 and 51, while in the wintertime the damper 47 would be closed and the damper 49 open, thus returning the cold air through the register 48 to the duct 51.

The return air, either warm or cold, is returned through ducts 51, 42 and 43 from registers 46, 35 and 37 respectively, and the flow of air through these ducts is controlled by butterfly or quadrant dampers 41, 38 and 44. These ducts lead to the return air inlet 15, which is the preferred point at which to cool the air in the summertime.

Figure 14:
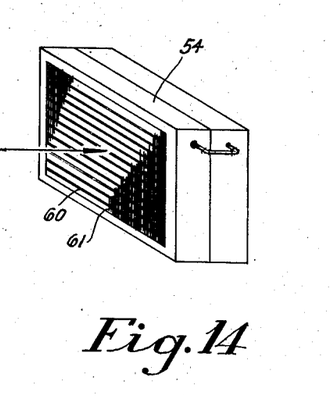
Figure 14 is a similar view of the coil showing the other end.
Figure 15:
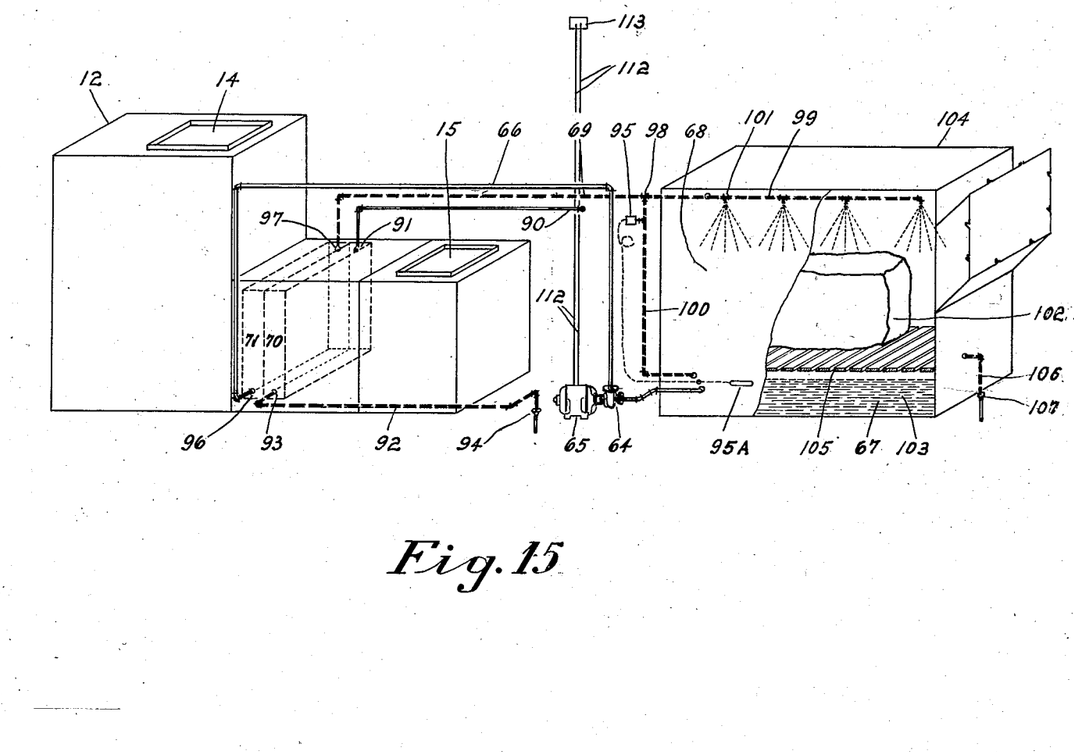
Figure 15 is a perspective view of the unit showing cooling by ice water and city water.

As shown in Figure 14, the air is preferably cooled and conditioned by passing it over cooling coils 54 positioned in the air stream before the blower. This cooling coil is of conventional design with tubes 60 and fins 61 mounted thereon, as shown in Figures 15 and 16. The cooling water enters the coil through the cold water inlet 55 from the supply pipe 52 and the flow is controlled by the valve 53. The cooling water is discharged from the coils through the water outlet 56. With cold city water or deep well water, the water after passing through the coil may be discharged as waste, or when the city water is 70° or over, a portion of the cooling may be done with city water and the remainder by means of cold water cooled by ice, as is shown in Figure 17, wherein 64 is a circulating pump actuated by motor 65. 66 is the ice water supply to the coil;

67 an ice water reservoir; 68 an ice bunker; 69 the return from the coil to the reservoir. With this arrangement it is desirous to use two coils, 70 and 71. City water is run through coil 70, thus slightly cooling the air before it passes through the coil 71, which is cooled with ice water and thus lessens the load placed upon the coil 71. If desired, cooling by direct expansion may be substituted for ice water.

In Figure 13, 90 is a water supply pipe from city water mains or well, connected with coil 70 at 91, and 92 is a water outlet connected with coil 70 at 93 and emptying into a drain 94. 95 is a temperature controlled valve actuated by temperature of the water surrounding the bulb 95A. The ice water supply pipe 66 is connected to the coil 71 at the inlet 96, and the return pipe 69 is connected to coil 71 at the outlet 97. At 98 the return pipe 69 is divided into two branches, 99 and 100. The pipe 99 is equipped with sprays 101 requiring pressure to operate. When the valve 95 is closed, the pressure in the pipe 69 will operate the sprays upon the ice 102, but when the ice water 103 is below a pre-determined temperature, the valve 95 will be open and the water from the return 69 will return to the water reservoir 67 through the pipe 100, whereby the melting of the ice is regulated. By this method the heat absorbed by the melting of the ice is utilized, as well as the absorption of heat required to raise the temperature of the ice water from 32° F. to 70° F. The ice bunker further comprises a casing 104 with a slatted floor 105, on which the ice rests, and a drain 106 controlled by the valve 107.

The motor 65 is controlled by a thermostat 113 connected to the motor by the electric line 112. The thermostat is a conventional thermostat responsive to the temperature of the air surrounding it, and when the temperature of the air surrounding it becomes lower than a pre-determined temperature, the thermostat will operate to close the motor 65, thereby stopping the circulation of the ice water through the coils.

The inlet to the drain pipe 106 is at such a level that when the ice melts and adds water to the system, the level of the water in the ice bunker will rise and when it reaches the top of the drain pipe 106, it will overflow into this drain pipe. Under this arrangement the amount of water in the ice bunker will never exceed a pre-determined amount and the surplus water drained off will be the warmest water, to-wit, the water returned from the coils.

Figure 7:
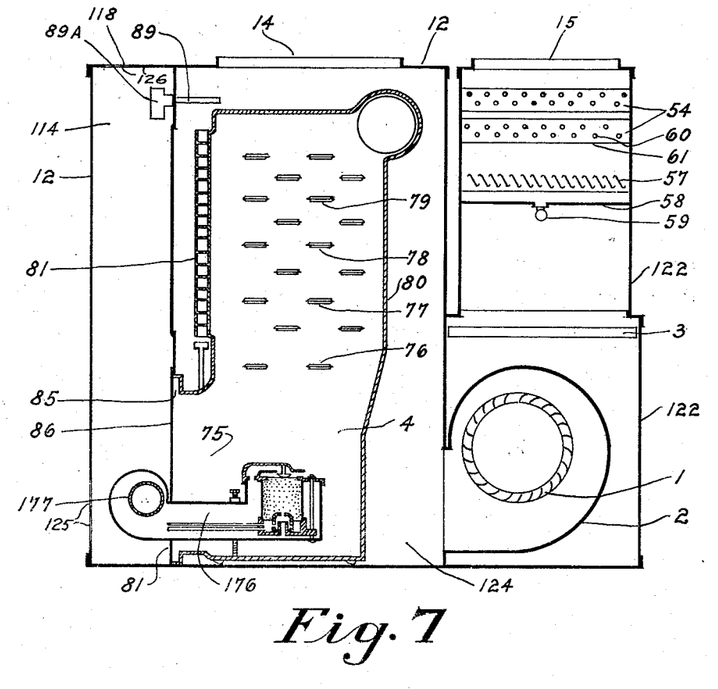
Figure 7 is a sectional view of the unit taken on line 4—4 of Figure 4.
Figure 8:
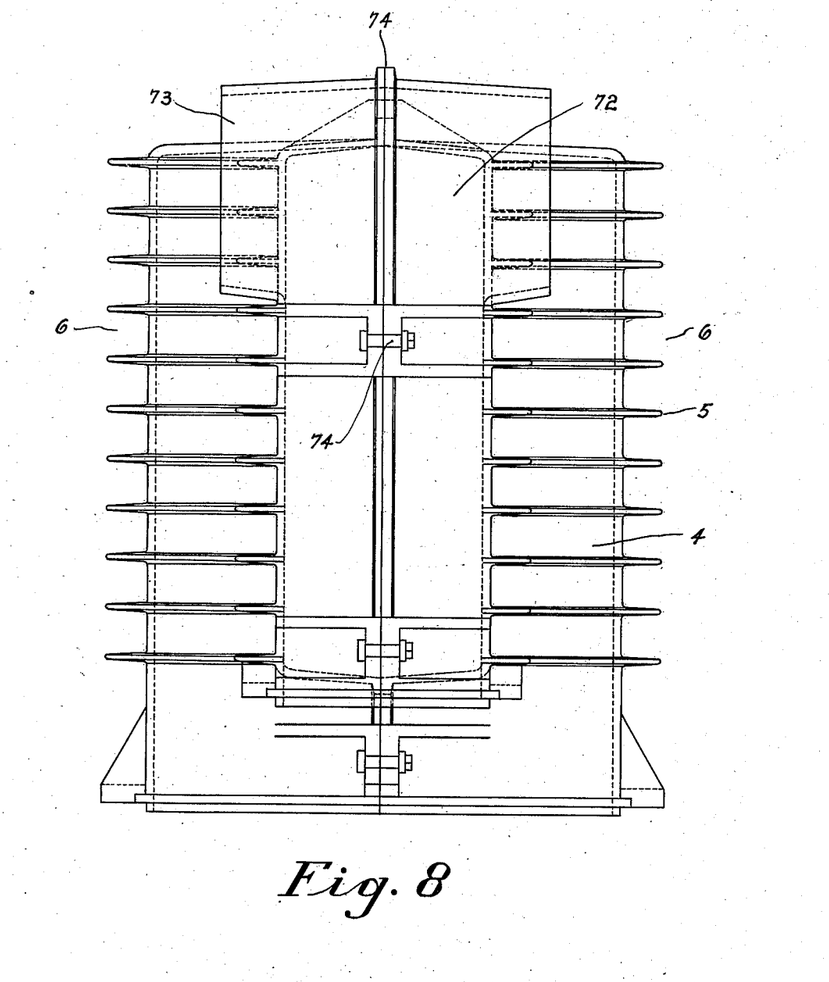
Figure 8 is a top view of the heat exchanger.

The oil burner is designed especially with reference to the size and shape of the heat exchanger 4 and adapted to be placed in the combustion chamber thereof, and Figure 7, shows and represents the oil burner in detail and its relationship to the exchanger and housing.

Referring to Figure 7, 80 represents the rear wall of the heat exchanger 4, and 81 represents the front wall thereof, 85 is an opening through the front wall of 81, adapted to allow the easy removal of the oil burner from the combustion chamber, and during operation that part of the opening which is not occupied by the oil burner housing is closed by an insulated panel 86, attached to the front wall 81. The blower fan 1 is operated by motor 88 controlled by a thermostat 89 responsive to the temperature of the air within the casing 12.

The capacity of the fan and the volume of air passed through the casing 12 is proportional to the B. t. u. output of the oil burner so that sufficient air will pass by the heat exchanger to wipe off an amount of heat approximately equal to the heat input from the oil burner, so that a constant flow of uniformly heated air will be discharged from the casing until after the oil burner shuts off. This correlation of the blower capacity and the heat exchanger capacity and the oil burner capacity results in an even and constant flow of heat. Further, the flow of air through the casing is pre-determined and is correlated to the flow of air through the heat exchanger 4, which flow is controlled by the fan 177. For example, the flow of air through the heat exchanger is 75 C. F. M. and the flow through the casing is 1500 C. F. M., so that twenty times as much air passes by the heat exchanger on the outside as goes through the heat exchanger. This is important because when the oil burner shuts off and the fan 177 is still running, only 75 C. F. M. through the heat exchanger tend to cool off the exchanger via the stack while 1500 C. F. M. tend to cool the exchanger via the casing 12 into the house. Thus, during the period of the cooling of the exchanger, twenty times as much heat is taken from the heat exchanger and forced into the house as goes up the chimney.

The bowl type oil burner is used in this particular exchanger because with the bowl type burner it is possible to confine the flame to a circular flame which does not touch the casting, and the casting is particularly designed to receive a bowl type burner with the sides a sufficient distance from the burner so that the flame from the oil burner does not touch the sides of the exchanger.

Figure 7 shows the eliminator plates 57, the purpose of which are to catch the water which drips from the coils 54 and convey the same to the drain 59.

Although one specific embodiment of the invention has been particularly shown and described, it will be understood that the invention is capable of modification and that changes in the construction and in the arrangement of the various co-operating parts may be made without departing from the spirit or scope of the invention, as expressed in the following claims.

What I claim is:

1. In an air conditioning unit, the combination of a casing having an air inlet and outlet, a blower producing a flow of air through said casing, a heat exchanger within said casing in the path of said air, a source of heat within said exchanger, a humidifier mounted on said exchanger, an air filter and a cooling coil comprising tubes with fins mounted thereon within said casing in the path of said air, a source of cold connected to said coil and means below said fins to catch the water of condensation on said fins, and means to control the supply of heat to said exchanger and of cold to said cooling coil.

2. In an air conditioning unit, the combination of a casing having an air inlet and outlet and containing a blower, a heat exchanger with a source of heat therein, an air filter and a humidifier, said blower producing a flow of air through said casing and filter and past said heat exchanger and humidifier, said exchanger having extended vertical fins parallel to the flow of said air, and baffles attached to said casing directing the flow of air toward said exchanger.

3. In an air conditioning unit, the combination of a casing having an air inlet and outlet and containing a blower, a heat exchanger with a source of heat therein, an air filter and a humidifier, said blower producing a flow of air through said casing and filter and past said heat exchanger and humidifier, said humidifier comprising a series of inclined metallic troughs disposed above each other, one side of said troughs being in heat conducting relationship to said exchanger, and means to introduce water into said troughs for evaporation into said flow of air.

4. In an air conditioning unit, the combination of a casing having an air inlet and outlet and containing a blower, a heat exchanger with a source of heat therein, an air filter and a humidifier, said blower producing a flow of air through said casing and filter and past said heat exchanger and humidifier, a detachable plate mounted on said exchanger, a series of inclined troughs integral with said plate and disposed above each other, and means to introduce water into said troughs for evaporation into said flow of air.

5. In an air conditioning unit, the combination of a casing having an air inlet and outlet and containing a blower, a heat exchanger with a source of heat therein, an air filter and a humidifier, said blower producing a flow of air through said casing and filter and past said heat exchanger and humidifier, openings into the upper portion of said exchanger for clean-out purposes, detachable plates closing said openings, a series of troughs integral with said plates, each trough at a different level, whereby water introduced into the highest trough will flow into the successive lower troughs and evaporate into said air stream.

6. In an air conditioning unit, the combination of a casing having an air inlet and outlet and containing a blower, a heat exchanger with a source of heat therein, an air filter and a humidifier, said blower producing a flow of air through said casing and filter and past said heat exchanger and humidifier, openings into the upper portion of said exchanger for clean-out purposes, detachable plates closing said openings, a series of troughs integral with said plates, each trough at a different level, and means to introduce water into the first trough of said series and a waste drain communicating with the last trough of said series for the disposal of unevaporated water.

7. In an air conditioning unit, the combination of a casing having an air inlet and outlet and containing a blower, a heat exchanger with a source of heat therein, an air filter and a humidifier, said blower producing a flow of air through said casing and filter and past said heat exchanger and humidifier, said humidifier comprising a series of inclined metallic troughs disposed at different levels, one side of said troughs being in heat conducting relationship to said exchanger, each trough having closed ends and an opening in the bottom of the trough at its lower end whereby water flows from the trough at the higher level to the trough at the lower level, and means to introduce water into said troughs for evaporation into said flow of air.

8. In an air conditioning unit, the combination of a casing forming an enclosure having an air inlet and outlet and containing a blower, a heat exchanger and a source of heat therein, and a second enclosure containing controls for said unit, said last enclosure being formed by one end of the first enclosure and an extension of the side and top walls thereof, and a movable front wall, and openings in the lower and upper portion of the second enclosure for the passage of air to cool the second enclosure.

REUBEN N. TRANE.